(12) United States Patent
Goslin et al.

(10) Patent No.: US 10,940,387 B2
(45) Date of Patent: Mar. 9, 2021

(54) SYNCHRONIZED AUGMENTED REALITY GAMEPLAY ACROSS MULTIPLE GAMING ENVIRONMENTS

(71) Applicant: DISNEY ENTERPRISES, INC., Burbank, CA (US)

(72) Inventors: Michael P. Goslin, Sherman Oaks, CA (US); Nathan Nocon, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 62 days.

(21) Appl. No.: 16/354,848

(22) Filed: Mar. 15, 2019

(65) Prior Publication Data
US 2020/0289920 A1    Sep. 17, 2020

(51) Int. Cl.
*A63F 13/00* (2014.01)
*A63F 13/25* (2014.01)
(Continued)

(52) U.S. Cl.
CPC ............ *A63F 13/25* (2014.09); *G06T 19/006* (2013.01); *H04W 4/021* (2013.01); *H04M 1/72544* (2013.01)

(58) Field of Classification Search
None
See application file for complete search history.

(56) References Cited

U.S. PATENT DOCUMENTS

| | | | |
|---|---|---|---|
| 10,055,887 B1* | 8/2018 | Gil | G06F 1/163 |
| 2006/0105838 A1* | 5/2006 | Mullen | A63F 13/12 463/31 |

(Continued)

FOREIGN PATENT DOCUMENTS

WO    2017/212208 A1    12/2017

OTHER PUBLICATIONS

Wang et al., "Augmented Reality Prototype HUD for Passenger Infotainment in a Vehicular Environment", URL: https://www.researchgate.net/publication/317606730_Augmented_Reality_Prototype_HUD_for_Passenger_Infotainment_in_a_Vehicular_Environment, Advances in Science, Technology and Engineering Systems Journal vol. 2, No. 3, Jun. 2017, pp. 634-641.
"Future First Person Shooter", https://www.youtube.com/watch?v=YUhUzUWOIug, Sep. 12, 2014, 1 page.
(Continued)

*Primary Examiner* — Paul A D'Agostino
(74) *Attorney, Agent, or Firm* — Artegis Law Group, LLP

(57) ABSTRACT

Various embodiments of the invention disclosed herein provide techniques for implementing augmented reality (AR) gameplay across multiple AR gaming environments. A synchronized AR gaming application executing on an AR gaming console detects that a first gaming console that is executing an AR gaming application has exited a first AR gaming environment and entered a second AR gaming environment. The synchronized AR gaming application connects to a communications network associated with the second AR gaming environment. The synchronized AR gaming application detects, via the communications network, a sensor associated with the second AR gaming environment. The synchronized AR gaming application alters execution of the AR gaming application based at least in part on sensor data received via the sensor to enable the AR gaming application to continue executing as the first gaming console exits the first AR gaming environment and enters the second AR gaming environment.

20 Claims, 4 Drawing Sheets

(51) Int. Cl.
H04W 4/021 (2018.01)
G06T 19/00 (2011.01)
H04M 1/725 (2021.01)

(56) References Cited

U.S. PATENT DOCUMENTS

| | | | |
|---|---|---|---|
| 2013/0311511 A1* | 11/2013 | Peng | G06F 16/29 |
| | | | 707/769 |
| 2014/0375688 A1* | 12/2014 | Redmann | G06T 19/006 |
| | | | 345/633 |
| 2015/0193982 A1* | 7/2015 | Mihelich | H04L 67/18 |
| | | | 345/633 |
| 2016/0026253 A1* | 1/2016 | Bradski | H04N 13/344 |
| | | | 345/8 |
| 2017/0050113 A1 | 2/2017 | Mullen | |
| 2017/0084051 A1 | 3/2017 | Weising et al. | |
| 2017/0243403 A1* | 8/2017 | Daniels | G06T 19/20 |
| 2017/0336863 A1* | 11/2017 | Tilton | G02B 27/017 |
| 2018/0005441 A1* | 1/2018 | Anderson | G06T 19/006 |
| 2018/0046861 A1* | 2/2018 | Patel | G06F 3/011 |
| 2018/0075694 A1 | 3/2018 | Frolov et al. | |
| 2018/0089927 A1* | 3/2018 | Anderson | G06T 19/006 |
| 2018/0146343 A1* | 5/2018 | Lee | G06F 3/147 |
| 2018/0309808 A1 | 10/2018 | Andon et al. | |
| 2018/0311573 A1* | 11/2018 | Pickover | G16H 40/63 |
| 2018/0315248 A1* | 11/2018 | Bastov | G06T 19/006 |
| 2018/0365650 A1* | 12/2018 | Jang | H04M 1/72566 |
| 2019/0197788 A1* | 6/2019 | Forbes | G06F 3/0346 |
| 2019/0224572 A1* | 7/2019 | Leeper | G06K 9/32 |
| 2019/0358547 A1* | 11/2019 | Mack | A63F 13/5255 |
| 2020/0037106 A1* | 1/2020 | Shiotsu | H04W 4/23 |
| 2020/0051328 A1* | 2/2020 | Mohan | G06T 7/74 |
| 2020/0064456 A1* | 2/2020 | Xu | G01S 13/56 |
| 2020/0081812 A1* | 3/2020 | Macklem-Clements | G06F 11/0709 |
| 2020/0099891 A1* | 3/2020 | Valli | H04N 13/111 |
| 2020/0175764 A1* | 6/2020 | Romea | G06T 7/70 |

OTHER PUBLICATIONS

Sekhavat et al., "KioskAR: An Augmented Reality Game as a New Business Model to Present Artworks" https://www.hindawi.com/journals/ijcgt/2016/7690754/, Oct. 26, 2015, 13 pages.

* cited by examiner

SYNCHRONIZED AUGMENTED REALITY GAMEPLAY ACROSS MULTIPLE GAMING ENVIRONMENTS

BACKGROUND OF THE INVENTION

Field of the Invention

The present invention relates generally to augmented reality technology and, more specifically, to synchronized augmented reality gameplay across multiple gaming environments.

Description of the Related Art

Computer-based AR gameplay has become a widely popular form of personal entertainment. Increasingly, computer-based gaming systems are virtual reality (VR)-based or augmented reality (AR)-based. In a VR system, a user experiences an artificial three-dimensional (3D) environment generated by a computer, where the user views the VR environment via a VR display apparatus, such as VR glasses or a VR headset. Similarly, in an AR system, a user sees and experiences both two-dimensional (2D) and/or three-dimensional (3D) objects generated by a computer as well as physical objects that exist in the actual real world, where the user views the AR environment via a display apparatus, such as AR glasses or an AR headset.

In one type of AR system, a user wears a special transparent device, such as an AR headset, through which the user views physical objects in the real world along with computer-generated virtual objects that are rendered onto a display surface of the AR headset. In other types of AR systems, a device projects images of the virtual objects directly onto the user's eyes as the user views the physical real-world environment. In yet other types of AR systems, a user holds a mobile device, such as a smartphone or tablet computer. The AR system is fitted with a camera to capture images of the physical environment surrounding the user. The captured images are superimposed with one or more virtual, computer-generated 2D and/or 3D objects and then displayed on the display screen of the AR system. For any of these types of AR systems, the virtual objects appear as objects in the physical real-world environment.

During a typical computer-based AR game, a user views computer-generated images on the VR system or AR system and manipulates controls on a game controller to achieve certain game-related results. For example, the user could manipulate the controls on a game controller to move a character through various challenges and solve puzzles, to fire weapons on a virtual intruder, or to retrieve certain objects for later use during the game.

As a general matter, a given computer-based AR game is usually optimized to a particular AR gaming environment and does not operate in other AR gaming environments. As one example, a computer-based AR game that is optimized for a residential AR gaming environment could be equipped with sensors that track the user along with walls, furniture, and other objects typically found in a residential home. However, a computer-based AR game that is optimized for a residential AR gaming environment would not be capable of detecting objects in a moving vehicle or in an open outdoor space. Similarly, a computer-based AR game that is optimized for a vehicle AR gaming environment could be equipped with sensors that track the user along with objects within a vehicle passenger compartment as well as objects outside of the vehicle while the vehicle is in motion. However, a computer-based AR game that is optimized for a vehicle AR gaming environment would not be capable of detecting objects in a home or in an open outdoor space. Further, a computer-based AR game that is optimized for an outdoor AR gaming environment could be configured with sensors that track the user and other objects moving in an open area, but would not be capable of detecting objects in a home or in a moving vehicle. Each of these computer-based AR games is optimized for the unique types of objects and sensors found in a particular AR gaming environment. Outside of the AR gaming environment for which a computer-based AR game was optimized, the computer-based AR game is rendered unusable or significantly limited.

As noted above, one drawback of conventional computer-based AR gaming systems is that users are generally unable to move from one AR gaming environment to another AR gaming environment when playing the computer-based AR game. Instead, when a user moves from a first AR gaming environment to a second AR gaming environment, the user typically has to exit the computer-based AR game, which has been optimized for the first AR gaming environment. Once the user is within the second AR gaming environment, the user executes a different computer-based AR game that has been optimized for the second AR gaming environment. Such disruptions in AR gameplay result in suboptimal user experiences.

As the foregoing illustrates, what is needed in the art are more effective techniques for implementing augmented reality gameplay across different gaming environments.

SUMMARY OF THE INVENTION

Various embodiments of the invention disclosed herein provide a method for implementing augmented reality (AR) gameplay across multiple gaming environments. The method includes detecting that a first gaming console that is executing an AR gaming application has exited a first AR gaming environment and entered a second AR gaming environment. The method further includes connecting to a communications network associated with the second AR gaming environment. The method further includes detecting, via the communications network, a sensor associated with the second AR gaming environment. The method further includes altering execution of the AR gaming application based at least in part on sensor data received via the sensor to enable the AR gaming application to continue executing as the first gaming console exits the first AR gaming environment and enters the second AR gaming environment.

Other embodiments of the present invention include, without limitation, a computer-readable medium including instructions for performing one or more aspects of the disclosed techniques, as well as a computing device and system for performing one or more aspects of the disclosed techniques.

At least one technical advantage of the disclosed techniques relative to the prior art is that a user experiences a more seamless gaming experience when transitioning from one augmented reality gaming environment to another augmented reality gaming environment. In that regard, the disclosed techniques enable a user's AR headset to automatically disconnect from one augmented reality gaming environment and reconnect to the other augmented reality gaming environment without interrupting gameplay. In so doing, the user's AR headset automatically switches from receiving sensor data from sensors in the previous augmented reality gaming environment to receiving sensor data from sensors in the new augmented reality gaming environment. As a result, the user can have a more immersive and uninterrupted experience when playing a computer-based augmented reality game. These technical advantages represent one or more technological improvements over prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
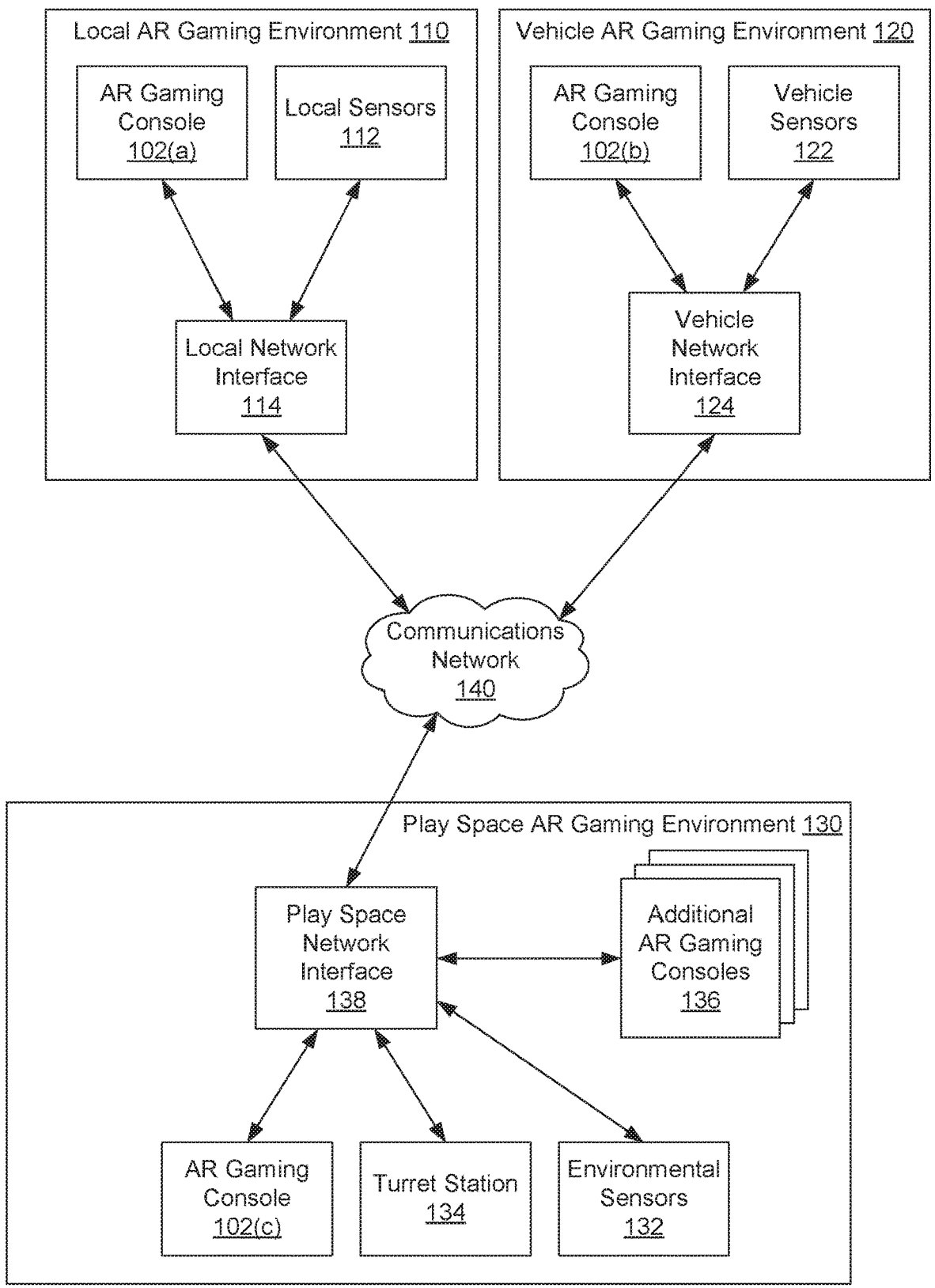
FIG. 1 illustrates a system configured to implement one or more aspects of the present invention.

FIG. 1 illustrates a system 100 configured to implement one or more aspects of the present invention. As shown, the system includes, without limitation, a local AR gaming environment 110, a vehicle AR gaming environment 120, and a play space AR gaming environment 130 in communication with each other via a communications network 140. Communications network 140 may be any suitable environment to enable communications among remote or local computer systems and computing devices, including, without limitation, point-to-point communications channels, Bluetooth, WiFi, infrared communications, wireless and wired LANs (Local Area Networks), one or more internet-based WANs (Wide Area Networks), and cellular data networks.

Local AR gaming environment 110 includes, without limitation, an AR gaming console 102(a), local sensors 112, and a local network interface 114. AR gaming console 102(a), local sensors 112, and local network interface 114 communicate with each other over one or more communications channels. The communications channels may be associated with any suitable environment to enable communications among remote or local computer systems and computing devices, including, without limitation, point-to-point communications channels, Bluetooth, WiFi, infrared communications, wireless and wired LANs (Local Area Networks), one or more internet-based WANs (Wide Area Networks), and cellular data networks.

As further discussed herein, AR gaming console 102(a), 102(b), and 102(c) represent the same AR gaming console in different environments. The user may seamlessly transition across different gaming environments by moving the AR gaming console from one gaming environment to another gaming environment. When in local AR gaming environment 110, the AR gaming console is referred to as AR gaming console 102(a). Similarly, when in vehicle AR gaming environment 120, the AR gaming console is referred to as AR gaming console 102(b). Further, when in play space AR gaming environment 130, the AR gaming console is referred to as AR gaming console 102(c). The AR gaming console may be flexibly and seamlessly moved across any of local AR gaming environment 110, vehicle AR gaming environment 120, and play space AR gaming environment 130, in any technically feasible combination.

AR gaming console 102(a) includes, without limitation, a computing device that may be a personal computer, personal digital assistant, mobile phone, mobile device, or any other device suitable for implementing one or more aspects of the present invention. In some embodiments, AR gaming console 102(a), may include an embedded computing system that is integrated into augmented reality goggles, augmented reality glasses, heads-up display (HUD), handheld device, or any other technically feasible AR viewing device.

In operation, AR gaming console 102(a) executes a synchronized AR gaming application to control various aspects of gameplay. AR gaming console 102(a) receives control inputs from internal sensors, including tracking data. Additionally or alternatively, AR gaming console 102(a) receives control inputs from local sensors 112, including tracking data. The tracking data includes the position and/or orientation of AR gaming console 102(a). From this tracking data, AR gaming console 102(a) determines the location of the user and the direction that the user is looking. Additionally or alternatively, the tracking data includes the position and/or orientation of one or more walls, ceilings, and other objects detected by AR gaming console 102(a) and/or local sensors 112. Based on the tracking data, AR gaming console 102(a) may alter the execution of one or more aspects of the computer-generated AR game. As one example, AR gaming console 102(a) could include one or more cameras and a mechanism for tracking objects visible in images captured by the camera. AR gaming console 102(a) could detect when the hands of the user are included in the image captured by the camera. AR gaming console 102(a) could then determine the location and orientation of the hands of the user.

Similarly, AR gaming console 102(a) receives control inputs from one or more game controllers (not shown). The control inputs include, without limitation, button presses, trigger activations, and tracking data associated with the game controllers. The tracking data may include the location and/or orientation of the game controllers. The game controllers transmit control inputs to AR gaming console 102 (a). In this manner, AR gaming console 102(a) determines which controls of the game controllers are active. Further, AR gaming console 102(a) tracks the location and orientation of the game controllers. Each game controller may be in any technically feasible configuration, including, without limitation, a button panel, a joystick, a wand, a handheld weapon, a steering mechanism, a data glove, or a controller sleeve worn over the user's arm.

Local sensors 112 transmit tracking data and other information to AR gaming console 102(a) via local network interface 114. Local sensors 112 supplement the tracking data that is detected directly via sensors integrated into AR gaming console 102(a). Local sensors 112 may include, without limitation, simultaneous localization and mapping (SLAM) tracking systems, beacon tracking systems, security cameras, lighthouse tracking and other laser-based tracking systems, and smart home sensing systems, in any technically feasible combination.

Local network interface 114 provides an interface between communications network 140 and the local network over which AR gaming console 102(a) and local sensors 112 communicate. Additionally or alternatively, any one or more of AR gaming console 102(a) and local sensors 112 may communicate directly with communications network 140.

Vehicle AR gaming environment 120 includes, without limitation, an AR gaming console 102(b), vehicle sensors 122, and a vehicle network interface 124. AR gaming console 102(b), vehicle sensors 122, and vehicle network interface 124 communicate with each other over one or more communications channels. The communications channels may be associated with any suitable environment to enable communications among remote or local computer systems and computing devices, including, without limitation, point-to-point communications channels, Bluetooth, WiFi, infrared communications, wireless and wired LANs (Local Area Networks), one or more internet-based WANs (Wide Area Networks), and cellular data networks.

AR gaming console 102(b) functions substantially the same as AR gaming console 102(a) except as further described below.

Vehicle sensors 122 transmit tracking data and other information to AR gaming console 102(b) via vehicle network interface 124. Vehicle sensors 122 supplement the tracking data that is detected directly via sensors integrated into AR gaming console 102(b). Vehicle sensors 122 may include, without limitation, one or more cameras, vehicle tracking sensors, inertial sensors, seat sensors, or real-time sensors for an autonomous driving system, in any technically feasible combination. Based on data from sensors integrated into AR gaming console 102(b) along with data from vehicle sensors 122, AR gaming console 102(b) computes the real-time direction and location of the vehicle, rate of travel, acceleration, braking, and linear and torque forces exerted on the vehicle. In addition, based on data from sensors integrated into AR gaming console 102(b) along with data from vehicle sensors 122, AR gaming console 102(b) computes the location of the user and the direction that the user is looking. In the case of a moving vehicle, AR gaming console 102(b) analyzes vehicle AR gaming environment 120 to select a suitable stable reference point within the moving vehicle, and not a reference point that is external to the moving vehicle. By selecting a reference point within the moving vehicle, AR gaming console 102(b) may accurately identify the location and orientation of the user, game controllers, and other objects within the moving vehicle.

Vehicle network interface 124 provides an interface between communications network 140 and the local network over which AR gaming console 102(b) and vehicle sensors 122 communicate. Additionally or alternatively, any one or more of AR gaming console 102(b) and vehicle sensors 122 may communicate directly with communications network 140.

Play space AR gaming environment 130 includes, without limitation, an AR AR gaming console 102(c), environmental sensors 132, a turret station 134, and a play space network interface 138. AR gaming console 102(c), environmental sensors 132, turret station 134, and play space network interface 138 communicate with each other over one or more communications channels. The communications channels may be associated with any suitable environment to enable communications among remote or local computer systems and computing devices, including, without limitation, point-to-point communications channels, Bluetooth, WiFi, infrared communications, wireless and wired LANs (Local Area Networks), one or more internet-based WANs (Wide Area Networks), and cellular data networks.

AR gaming console 102(c) functions substantially the same as AR gaming console 102(a) and AR gaming console 102(b), except as further described below.

Environmental sensors 132 transmit tracking data and other information to AR gaming console 102(c) via play space network interface 138. Environmental sensors 132 supplement the tracking data that is detected directly via sensors integrated into AR gaming console 102(c). Environmental sensors 132 may include, without limitation, security cameras, image recognition systems, global positioning system (GPS) tracking systems, landmark positioning systems, user and skeleton-based tracking systems, geo-fencing systems and geotagging systems, in any technically feasible combination.

Certain play space environments 130 may include a turret station 134 in addition to environmental sensors 132, where a turret station 134 is a structure, such as a tower or outbuilding, that is fitted with one or more sensors. The sensors included in the turret station 134 transmit tracking data and other information to AR gaming console 102(c) via play space network interface 138. The sensors included in the turret station 134 supplement the tracking data that is detected directly via sensors integrated into AR gaming console 102(c) and the tracking data from environmental sensors 132. The sensors included in the turret station 134 may include, without limitation, security cameras, image recognition systems, GPS tracking systems, landmark positioning systems, user and skeleton-based tracking systems, geo-fencing systems and geotagging systems, in any technically feasible combination.

Certain play space environments 130 are equipped to facilitate multiuser computer-based AR games. In such play space environments 130, AR gaming console 102(c) interacts with one or more additional AR gaming consoles 136 operated by other users. The additional AR gaming consoles 136 function substantially the same as AR gaming console 102(c). As such, each of the additional AR gaming consoles 136 executes additional instances of the computer-based AR game that is executed by AR gaming console 102(c). Further, the additional AR gaming consoles 136 may receive tracking data and other information from sensors integrated into the additional AR gaming consoles 136, environmental sensors 132 and sensors included in the turret station 134, in any technically feasible combination.

Play space network interface 138 provides an interface between communications network 140 and the local network over which AR gaming console 102(c), environmental sensors 132, turret station 134, and additional AR gaming consoles 136 communicate. Additionally or alternatively, any one or more of AR gaming console 102(c), environmental sensors 132, turret station 134, and additional AR gaming consoles 136 may communicate directly with communications network 140.

It will be appreciated that the system shown herein is illustrative and that variations and modifications are possible. In one example, the system 100 of FIG. 1 is illustrated with a certain number and configuration of AR gaming consoles 102, local sensors 112, vehicle sensors 122, environmental sensors 132, turret stations 134, additional AR gaming consoles 136, and network interfaces. However, the system 100 could include any technically feasible number and configuration of AR gaming consoles 102, local sensors 112, vehicle sensors 122, environmental sensors 132, turret stations 134, additional AR gaming consoles 136, and network interfaces within the scope of the present disclosure.

In another example, the techniques are disclosed as being executed on an AR gaming console 102 that is integrated into an AR headset. However, the disclosed techniques could be performed by the AR gaming console 102 of FIG. 1, an AR gaming console embedded into a standalone computing device, a computer integrated into a vehicle, or a virtual AR gaming console executing on a server connected to communications network 140, in any technically feasible combination. Further, any one or more of the disclosed techniques may be performed by, In yet another example, the techniques are disclosed herein in the context of computer gaming AR environments. However, the disclosed techniques could be employed in any technically feasible environment within the scope of the present disclosure. The disclosed techniques could be employed in teleconferencing applications where individual or multi-person groups, such as a group convened in a corporate conference room, communicate and/or collaboratively work with each other. Additionally or alternatively, the disclosed techniques could be employed in scenarios where a user engages in an interactive meeting with a physician or other professional. Additionally or alternatively, the disclosed techniques could be employed in collaborative work scenarios where a single user, multiple users, and/or groups of users review and edit various documents that appear on a display monitor 106 and/or in 3D space as AR objects rendered and displayed by AR headset system 104. Any or all of these embodiments fall within the scope of the present disclosure, in any technically feasible combination. More generally, one skilled in the art would recognize that these examples are non-limiting and that any technically feasible implementation falls within the scope of the invention.

Techniques for transitioning across multiple gaming environments as part of an immersive computer gaming experience are now described in greater detail below in conjunction with FIGS. 2-3B.

Augmented Reality Gameplay Across Multiple Gaming Environments

Figure 2:
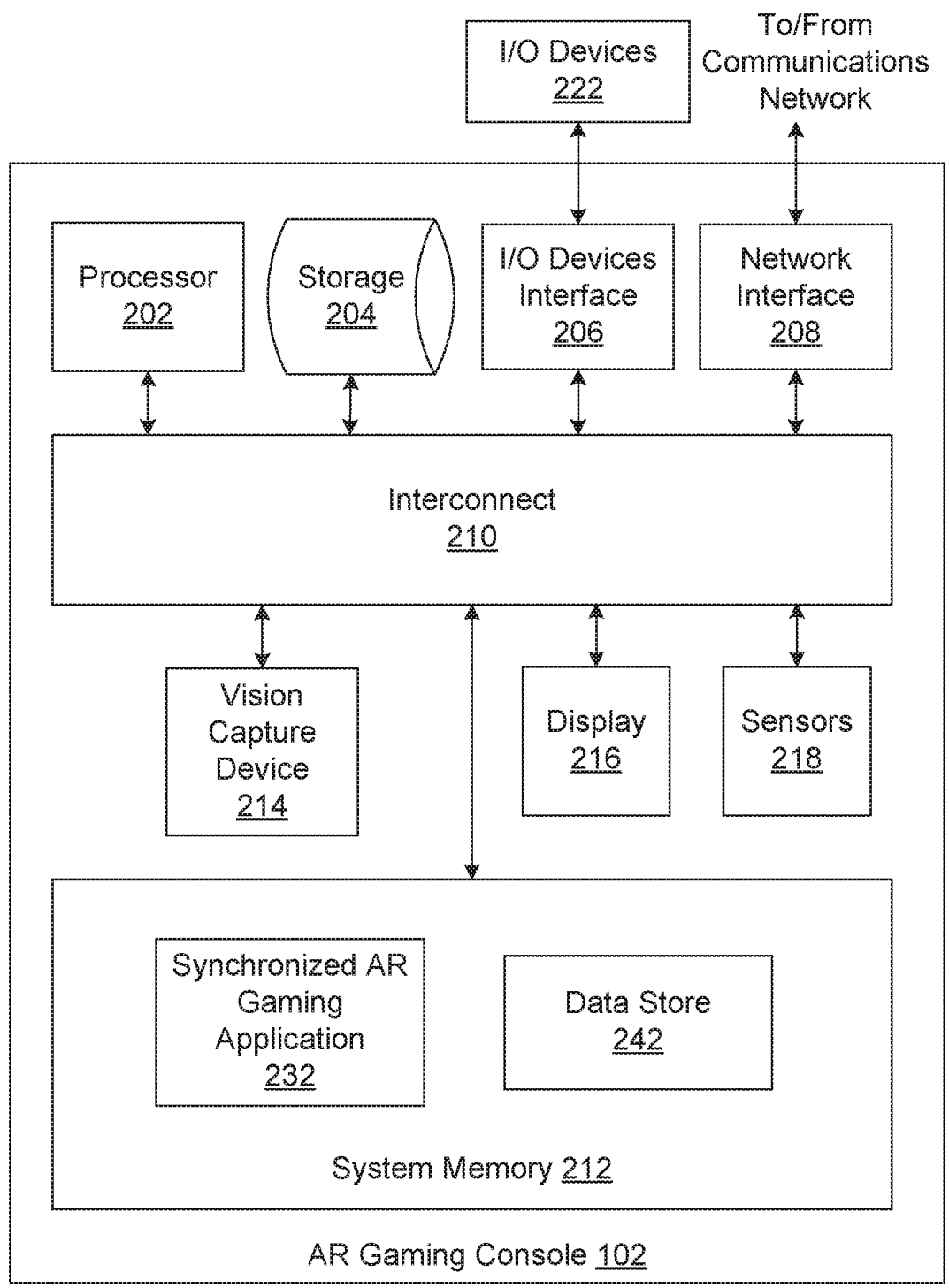
FIG. 2 is a more detailed illustration of the AR gaming console of FIG. 1, according to various embodiments of the present invention.

FIG. 2 is a more detailed illustration of the AR gaming console 102 of FIG. 1, according to various embodiments of the present invention. As shown in AR headset system 104 includes, without limitation, a processor 202, storage 204, an input/output (I/O) devices interface 206, a network interface 208, an interconnect 210, a system memory 212, a vision capture device 214, a display 216, and sensors 218.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, system memory 212, vision capture device 214, display 216, and sensors 218. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include one or more speaker configured to generate an acoustic output in response to the electrical audio output signal. The speakers may be integrated into a monaural, stereo, or multi-speaker headset system. The I/O devices interface 206 may also include an audio input unit that includes one or more microphones. In some embodiments, the audio input unit may be employed for performing noise cancellation, where one or more noise cancellation signals are transmitted to one or more speakers included in the audio output unit.

The vision capture device 214 includes one or more cameras to capture images from the physical environment for analysis, processing, and display. In operation, the vision capture device 214 captures and transmits vision information to any one or more other elements included in the AR headset system 104. The one or more cameras may include infrared cameras, monochrome cameras, color cameras, time-of-flight cameras, stereo cameras, and multi-camera imagers, in any technically feasible combination. In some embodiments, the vision capture device 214 provides support for various vision-related functions, including, without limitation, image recognition, visual inertial odometry, and simultaneous locating and mapping (SLAM) tracking.

The display 216 generally represents any technically feasible means for generating an image for display. The display 216 includes one or more display devices for displaying AR objects and other AR content. The display may be embedded into a head-mounted display (HMD) system that is integrated into the AR headset system 104. The display 216 reflects, overlays, and/or generates an image including one or more AR objects into or onto the physical environment via an liquid crystal device (LCD) display, light emitting diode (LED) display, organic light emitting diode (OLED) display, digital light processing (DLP) display, waveguide-based display, projection display, reflective display, or any other technically feasible display technology. The display 216 may employ any technically feasible approach to integrate AR objects into the physical environment, including, without limitation, pass-thru, waveguide, and screen-mirror optics approaches. The display device may be a TV that includes a broadcast or cable tuner for receiving digital or analog television signals.

The sensors 218 include one or more devices to acquire location and orientation data associated with the AR headset system 104. The sensors 218 may employ any technically feasible approach to acquire location and orientation data, including, without limitation, GPS tracking, radio frequency identification (RFID) tracking, gravity-sensing approaches and magnetic-field-sensing approaches. In that regard, the sensors 218 may include any one or more accelerometers, gyroscopes, magnetometers, and/or any other technically feasible devices for acquiring location and orientation data. The location and orientation data acquired by sensors 218 may be supplemental to or as an alternative to camera orientation data, e.g. yaw, pitch, and roll data, generated by the vision capture device 214.

Processor 202 is included to be representative of a single CPU, multiple CPUs, a single CPU having multiple processing cores, a graphic processing unit (GPU), a digital signal processor (DSP), and the like, in any technically feasible combination. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network, such as communications network 140. Network interface 208 may support for various communications channels, including, without limitation, point-to-point communications channels, Bluetooth, WiFi, infrared communications, wireless and wired LANs (Local Area Networks), one or more internet-based WANs (Wide Area Networks), and cellular data networks, in any technically feasible combination.

The system memory 212 includes, without limitation, a synchronized AR gaming application 232 and a data store 242. Synchronized AR gaming application 232, when executed by the processor 202, performs one or more operations associated with AR gaming console 102 of FIG. 1, as further described herein. Data store 242 provides memory storage for various items of gaming content, as further described herein. Synchronized AR gaming application 232 stores data in and retrieves data from data store 242, as further described herein.

In operation, synchronized AR gaming application 232 executes a synchronized AR gaming application to control various aspects of gameplay. Synchronized AR gaming application 232 receives control inputs from internal sensors, including tracking data. Additionally or alternatively, Synchronized AR gaming application 232 receives control inputs, including tracking data, from one or more sensors external to AR gaming console 102. The tracking data includes the position and/or orientation of the AR gaming console 102. From this tracking data, Synchronized AR gaming application 232 determines the location of the user and the direction that the user is looking. Additionally or alternatively, the tracking data includes the position and/or orientation of one or more users and other objects detected by synchronized AR gaming application 232 and/or external sensors. Based on the tracking data, synchronized AR gaming application 232 may alter the execution of one or more aspects of the computer-generated AR game.

Similarly, synchronized AR gaming application 232 receives control inputs from one or more game controllers (not shown). The control inputs include, without limitation, button presses, trigger activations, and tracking data associated with the game controllers. The tracking data may include the location and/or orientation of the game controllers. The game controllers transmit control inputs to synchronized AR gaming application 232 via AR gaming console 102. In this manner, synchronized AR gaming application 232 determines which controls of the game controllers are active. Further, synchronized AR gaming application 232 tracks the location and orientation of the game controllers. Each game controller may be in any technically feasible configuration, including, without limitation, a button panel, a joystick, a wand, a handheld weapon, a steering mechanism, a data glove, or a controller sleeve worn over the user's arm.

In addition, synchronized AR gaming application 232 detects when AR gaming console 102 is moved from one gaming environment to a different gaming environment. In response, synchronized AR gaming application 232 transitions across the gaming environments. More specifically, synchronized AR gaming application 232 automatically disconnects from the current gaming environment and connects to the new gaming environment without interrupting gameplay of the computer-based AR game. An example case of transitioning across multiple gaming environments is now described.

A user in a local AR gaming environment 110, such as the user's home, begins executing synchronized AR gaming application 232 in order to play a computer-based AR game. Synchronized AR gaming application 232 identifies one or more wireless or wired networks that are active within local AR gaming environment 110. Synchronized AR gaming application 232 identifies a network that AR gaming console 102 is authorized to access. In some embodiments, synchronized AR gaming application 232 may detect a network signal from a network that AR gaming console 102 is authorized to access. Synchronized AR gaming application 232 connects to the network and identifies one or more local sensors 112 that are within local AR gaming environment 110. Synchronized AR gaming application 232 receives sensor data from sensors that are integrated into AR gaming console 102 as well as sensor data from local sensors 112. Via the sensor data, synchronized AR gaming application 232 tracks the location and orientation of the user and other objects within local AR gaming environment 110. Based on the tracking data, synchronized AR gaming application 232 may alter the execution of one or more aspects of the computer-generated AR game.

In some embodiments, synchronized AR gaming application 232 may detect a computing device within local AR gaming environment 110 that is in communication with a local communications network and is capable to perform one or more of the techniques performed by synchronized AR gaming application 232. If such a computing device is detected, synchronized AR gaming application 232 may offload all or a portion of the tasks of the computer-based AR game to the computing device. In this manner, synchronized AR gaming application 232 may reduce the power consumed by AR gaming console 102 and improve performance of the computer-based AR game. Subsequently, synchronized AR gaming application 232 may detect that AR gaming console 102 is about to exit local AR gaming environment 110. In response, synchronized AR gaming application 232 may offload all or a portion of the tasks previously offloaded to the computing device back to AR gaming console 102.

The user then decides to leave home and travel by vehicle to a play space. As the user leaves home, synchronized AR gaming application 232 detects that AR gaming console 102 is no longer within local AR gaming environment 110. In so doing, synchronized AR gaming application 232 may detect that AR gaming console 102 has disconnected from the network within local AR gaming environment 110. Additionally or alternatively, synchronized AR gaming application 232 may detect that a received signal strength indicator (RSSI) level of a signal received from one or more local sensors 112 or from local network interface 114 has fallen below a threshold level. Additionally or alternatively, synchronized AR gaming application 232 may detect, via one or more local sensors 112, that AR gaming console 102 is no longer in a bounded area of a residence associated with the local AR gaming environment 110. Upon detecting AR gaming console 102 is no longer within local AR gaming environment 110, synchronized AR gaming application 232 continues gameplay, but without relying on sensor data from local sensors 112. Instead, synchronized AR gaming application 232 continues gameplay based only on sensor data from the sensors integrated into AR gaming console 102.

Subsequently, the user enters the vehicle. Synchronized AR gaming application 232 identifies one or more wireless or wired networks that are active within vehicle AR gaming environment 120. Synchronized AR gaming application 232 identifies a network that AR gaming console 102 is authorized to access. In some embodiments, synchronized AR gaming application 232 may detect a network signal from a network that AR gaming console 102 is authorized to access. Synchronized AR gaming application 232 connects to the network and identifies one or more vehicle sensors 122 that are within vehicle AR gaming environment 120. Synchronized AR gaming application 232 receives sensor data from sensors that are integrated into AR gaming console 102 as well as sensor data from vehicle sensors 122. Via the sensor data, synchronized AR gaming application 232 tracks the location and orientation of the user and other objects within vehicle AR gaming environment 120. Based on the tracking data, synchronized AR gaming application 232 may alter the execution of one or more aspects of the computer-generated AR game. Further, synchronized AR gaming application 232 may alter the execution of one or more aspects of the computer-generated AR game based on the operation of AR gaming console 102 within vehicle AR gaming environment 120. For example, synchronized AR gaming application 232 could generate a simulated spaceship via the AR headset to provide the experience of flying the spaceship within the computer-generated AR game. Further, synchronized AR gaming application 232 could enable the user to fire weapons from the spaceship towards other users who are playing the game as pedestrians or as occupants of one or more other vehicles.

In some embodiments, synchronized AR gaming application 232 may identify a computing device within vehicle AR gaming environment 120, such as the vehicle's computer, that is capable to perform one or more of the techniques performed by synchronized AR gaming application 232. If such a computing device is identified, synchronized AR gaming application 232 may offload all or a portion of the tasks of the computer-based AR game to the computing device. In this manner, synchronized AR gaming application 232 may reduce the power consumed by AR gaming console 102 and improve performance of the computer-based AR game. Subsequently, synchronized AR gaming application 232 may detect that AR gaming console 102 is about to exit vehicle AR gaming environment 120. In response, synchronized AR gaming application 232 may offload all or a portion of the tasks previously offloaded to the computing device back to AR gaming console 102.

The user then arrives at the play space and leaves the vehicle. As the user leaves the vehicle, synchronized AR gaming application 232 detects that AR gaming console 102 is no longer within vehicle AR gaming environment 120. In so doing, synchronized AR gaming application 232 may detect that AR gaming console 102 has disconnected from the network within vehicle AR gaming environment 120. Additionally or alternatively, synchronized AR gaming application 232 may detect that an RSSI level of a signal received from one or more vehicle sensors 122 or from vehicle network interface 124 has fallen below a threshold level. Additionally or alternatively, synchronized AR gaming application 232 may detect, via one or more vehicle sensors 122, that AR gaming console 102 is no longer in the passenger compartment and/or is outside of the vehicle. Upon detecting AR gaming console 102 is no longer within vehicle AR gaming environment 120, synchronized AR gaming application 232 continues gameplay, but without relying on sensor data from vehicle sensors 122. Instead, synchronized AR gaming application 232 continues gameplay based only on sensor data from the sensors integrated into AR gaming console 102.

Subsequently, the user enters the play space. Synchronized AR gaming application 232 identifies one or more wireless or wired networks that are active within play space AR gaming environment 130. Synchronized AR gaming application 232 identifies a network that AR gaming console 102 is authorized to access. In some embodiments, synchronized AR gaming application 232 may detect a network signal from a network that AR gaming console 102 is authorized to access. Synchronized AR gaming application 232 connects to the network and identifies one or more environmental sensors 122 that are within play space AR gaming environment 130. Additionally or alternatively, synchronized AR gaming application 232 identifies one or more sensors mounted on a turret station 134. Synchronized AR gaming application 232 receives sensor data from sensors that are integrated into AR gaming console 102 as well as sensor data from one or both of environmental sensors 122 and sensors mounted on turret station 134. Via the sensor data, synchronized AR gaming application 232 tracks the location and orientation of the user and other objects within play space AR gaming environment 130. Based on the tracking data, synchronized AR gaming application 232 may alter the execution of one or more aspects of the computer-generated AR game. Further, synchronized AR gaming application 232 detects additional AR gaming consoles 136 within play space AR gaming environment 130. In response, synchronized AR gaming application 232 interacts with the additional AR gaming consoles 136 to coordinate gameplay with other users within play space AR gaming environment 130.

In some embodiments, synchronized AR gaming application 232 may detect a computing device within play space AR gaming environment 130 that is in communication with a local communications network and is capable to perform one or more of the techniques performed by synchronized AR gaming application 232. If such a computing device is detected, synchronized AR gaming application 232 may offload all or a portion of the tasks of the computer-based AR game to the computing device. In this manner, synchronized AR gaming application 232 may reduce the power consumed by AR gaming console 102 and improve performance of the computer-based AR game. Subsequently, synchronized AR gaming application 232 may detect that AR gaming console 102 is about to exit play space AR gaming environment 130. In response, synchronized AR gaming application 232 may offload all or a portion of the tasks previously offloaded to the computing device back to AR gaming console 102.

Subsequently, the user leaves the play space. As the user leaves the play space, synchronized AR gaming application 232 detects that AR gaming console 102 is no longer within play space AR gaming environment 130. In so doing, synchronized AR gaming application 232 may detect that AR gaming console 102 has disconnected from the network within play space AR gaming environment 130. Additionally or alternatively, synchronized AR gaming application 232 may detect that a received signal strength indicator (RSSI) level of a signal received from one or more environmental sensors 112, from one or more sensors mounted on turret station 134, or from play space network interface 138 has fallen below a threshold level. Additionally or alternatively, synchronized AR gaming application 232 may detect that AR gaming console 102 has exited play space AR gaming environment 130 based on geotagging and/or geofencing data. Additionally or alternatively, synchronized AR gaming application 232 may detect, via one or more local sensors 112, that AR gaming console 102 is no longer in a defined area within the open play space associated with the play space AR gaming environment 130. Upon detecting AR gaming console 102 is no longer within play space AR gaming environment 130, synchronized AR gaming application 232 continues gameplay, but without relying on sensor data from environmental sensors 112 or from the sensors mounted on turret station 134. Instead, synchronized AR gaming application 232 continues gameplay based only on sensor data from the sensors integrated into AR gaming console 102.

In this manner, synchronized AR gaming application 232 generates seamless gameplay of a computer-generated AR game is the user transitions across multiple gaming environments.

In some embodiments, each AR gaming console for a set of users may possess a common game network identifier (ID) and a unique instance ID for multiuser peer-to-peer gameplay. In such embodiments, users with an AR gaming console that possesses the correct game network ID have permission to join the corresponding computer-generated AR game. Upon joining, the AR gaming console 102 may publish the unique instance ID. As a result, the other AR gaming consoles may identify that the corresponding user has joined the computer-generated AR game. Further, AR gaming consoles 102 may be geographically restricted. In this manner, an AR gaming console 102 that possess the correct game network ID may nevertheless be prohibited from joining the computer-generated AR game unless the AR gaming console 102 is within a certain distance from a specified geographical location. More specifically, AR gaming console 102 may detect that a second AR gaming console is executing the AR gaming application and is residing within a different AR gaming environment. AR gaming console 102 may determine that the second gaming console is within a threshold distance from the first gaming console. AR gaming console 102 may then alter execution of the AR gaming application to enable an interaction between the AR gaming consoles.

AR gaming consoles 102 may be connected to a network within a corresponding play space AR gaming environment 130. Additionally or alternatively, AR gaming consoles 102 may register onto the network from a remotely located network, such as a network within local AR gaming environment 110 or vehicle AR gaming environment 120. Additionally or alternatively, AR gaming consoles 102 that are not currently connected to a wireless network in a particular gaming environment may register onto the network via a cellular data network.

In some embodiments, a computer-based AR game may be controlled from one or more central servers connected to communications network 140. Additionally or alternatively, the computer-based AR game may be controlled via multiple peer-to-peer AR gaming consoles 102 that connect to generate a mesh network. In some embodiments, the computer-based AR game may be controlled via a hybrid system of a central servers connected to communications network 140 as well as a mesh network generated by multiple peer-to-peer AR gaming consoles 102. In such embodiments, AR gaming consoles 102 may execute the instances of the computer-based AR game while the one or more central services provide common services for the peer-to-peer AR gaming consoles 102. These central services may include, without limitation, voice commands, geo-fencing, geotagging, SLAM tracking, and control of autonomous computer-generated players.

In some embodiments, an AR gaming console 102 may employ one or more external cameras for remote viewing. In such embodiments, the AR gaming console 102 may display images from a remote camera on all or part of the display 216 in the AR gaming console 102. Additionally or alternatively, the AR gaming console 102 may generate sound effects, such as footsteps, or visual effects, such as shadows or warning messages, when an image from external camera indicates other users are nearby but are not currently in the field of view of the AR gaming console 102.

Figure 3A:
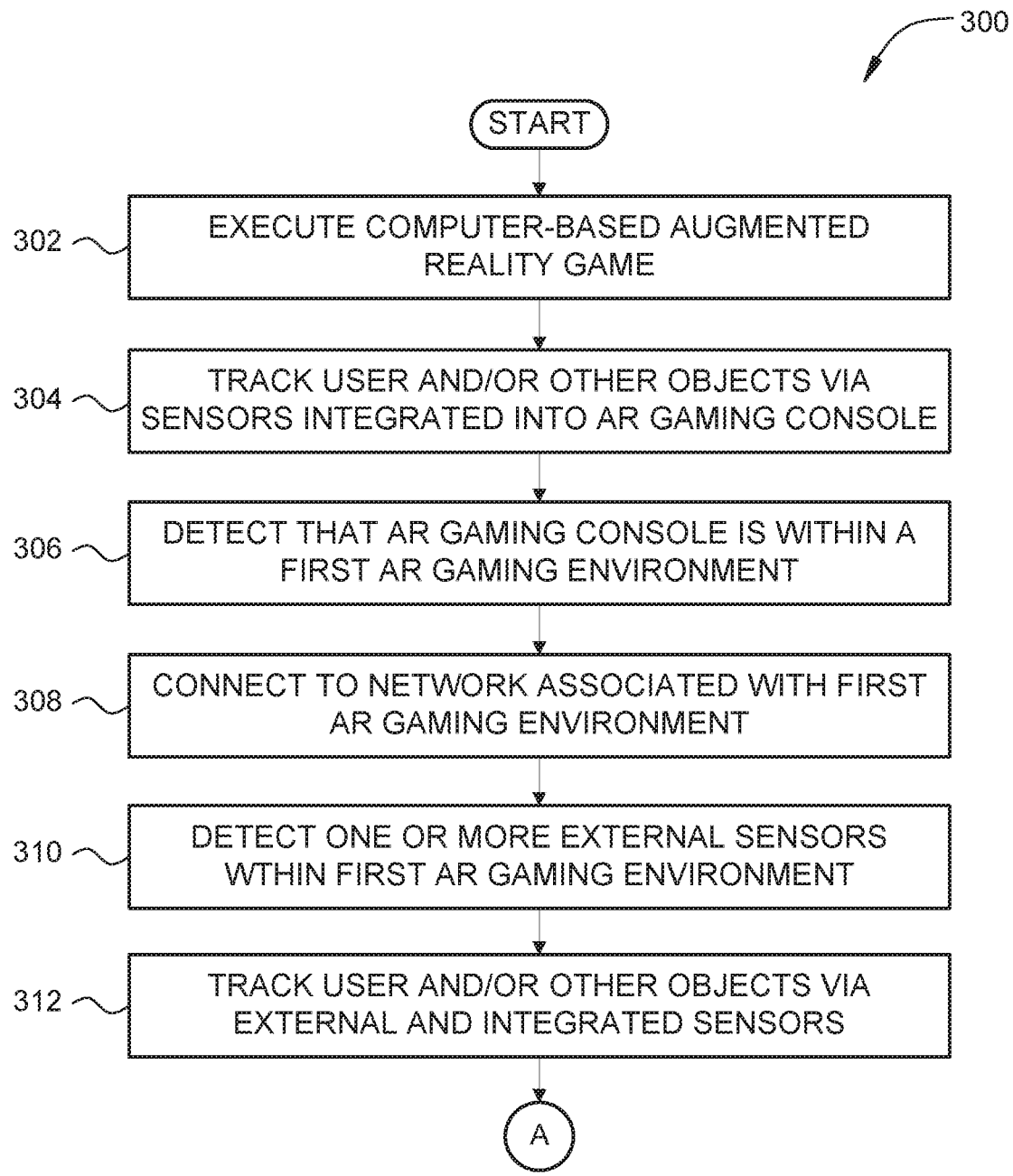
FIGS. 3A-3B set forth a flow diagram of method steps for enabling augmented reality gameplay across multiple gaming environments, according to various embodiments of the present invention.
Figure 3B:
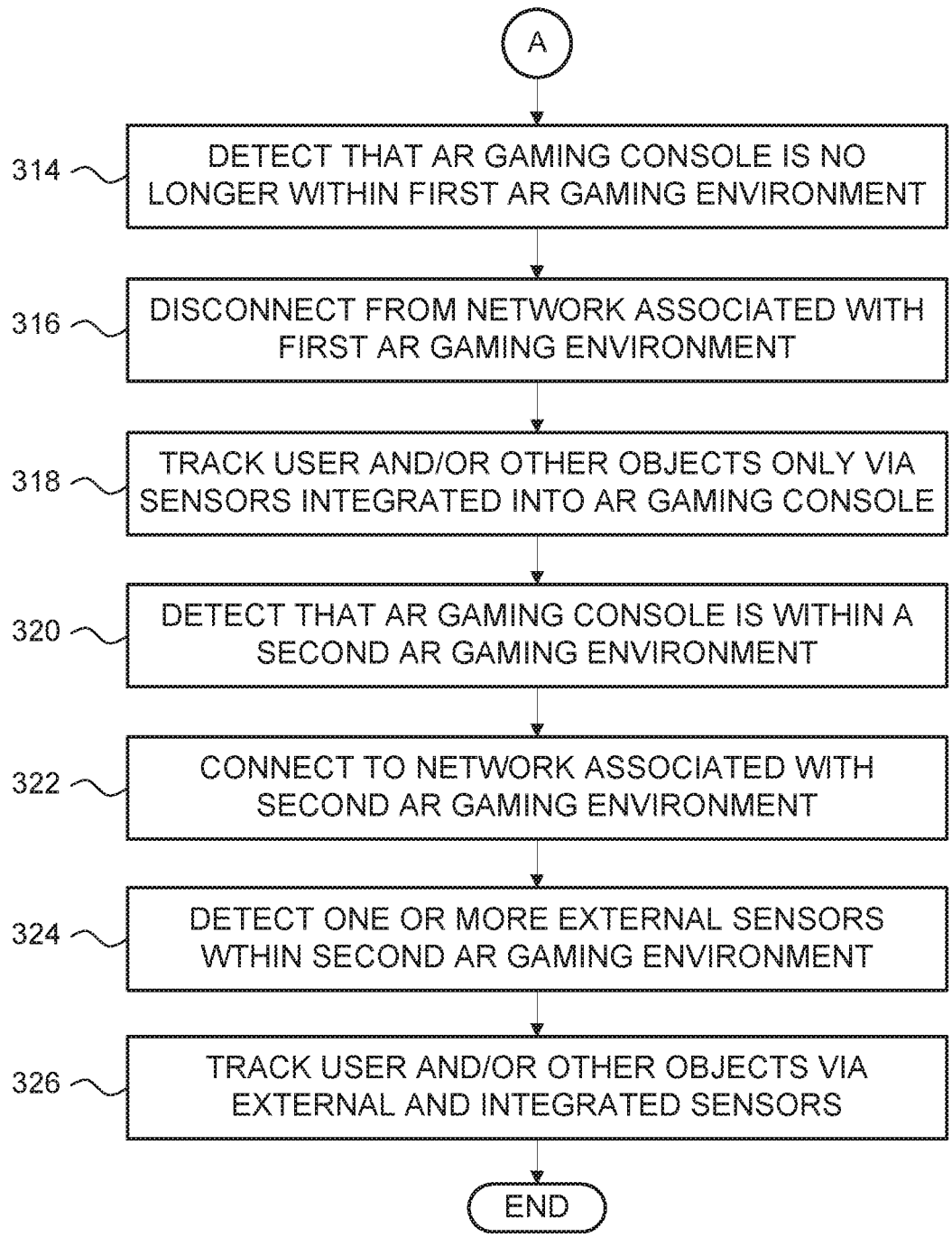

FIGS. 3A-3B set forth a flow diagram of method steps for enabling augmented reality gameplay across multiple gaming environments, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 300 begins at step 302, where synchronized AR gaming application 232 executes a computer-based AR game on an AR gaming console 102. The computer-based AR game may be an augmented reality game that the user plays with one or more other users via additional game consoles. At step 304, synchronized AR gaming application 232 tracks the user and/or other objects via one or more sensors integrated into AR gaming console 102. These sensors may include, without limitation, cameras, GPS trackers, RFID trackers, accelerometers, gyroscopes, and magnetometers. Based on the tracking data, synchronized AR gaming application 232 may alter the execution of one or more aspects of the computer-generated AR game. More specifically, synchronized AR gaming application 232 alters execution of the computer-generated AR game to alter the view of the user and display one or more AR objects to the user based on the tracking data. At step 306, synchronized AR gaming application 232 detects that AR gaming console 102 resides within a first AR gaming environment. More specifically, synchronized AR gaming application 232 detects one or more networks that are associated with a particular gaming environment. In some embodiments, synchronized AR gaming application 232 may detect a network signal from a network that AR gaming console 102 is authorized to access. The gaming environment may be a local AR gaming environment 110, a vehicle AR gaming environment 120, or a play space AR gaming environment 130. At step 308, synchronized AR gaming application 232 connects to a network associated with the first AR gaming environment. The network may include, without limitation, point-to-point communications channels, Bluetooth, WiFi, infrared communications, wireless and wired LANs (Local Area Networks), one or more internet-based WANs (Wide Area Networks), and cellular data networks. At step 310, synchronized AR gaming application 232 detects one or more external sensors within the first AR gaming environment. The external sensors may be any one or more of the sensors described herein. At step 312, synchronized AR gaming application 232 tracks the user and/or other objects via the detected external sensors within the first AR gaming environment as well as the one or more sensors integrated into AR gaming console 102. Based on the tracking data, synchronized AR gaming application 232 may alter the execution of one or more aspects of the computer-generated AR game. More specifically, synchronized AR gaming application 232 alters execution of the computer-generated AR game to alter the view of the user and display one or more AR objects to the user based on the tracking data. Further, synchronized AR gaming application 232 alters execution of the computer-generated AR game based on received sensor data in order to enable the synchronized AR gaming application 232 to continue executing as the first gaming console exits the first AR gaming environment and enters the second AR gaming environment.

Subsequently, at step 314 synchronized AR gaming application 232 detects that AR gaming console 102 is no longer within the first AR gaming environment. In so doing, synchronized AR gaming application 232 may detect that AR gaming console 102 has disconnected from the network within the first AR gaming environment. Additionally or alternatively, synchronized AR gaming application 232 may detect that an RSSI level of a signal received from one or more external sensors or from a network interface has fallen below a threshold level. The external sensors may be any one or more of the sensors described herein. Additionally or alternatively, synchronized AR gaming application 232 may detect that AR gaming console 102 has exited the first AR gaming environment based on geotagging and/or geo-fencing data. At step 316, synchronized AR gaming application 232 disconnects from the network associated with the first AR gaming environment. As a result, synchronized AR gaming application 232 ceases tracking the user and/or other objects based on external sensor data. Instead, at step 318, synchronized AR gaming application 232 tracks the user and/or other objects via only the one or more sensors integrated into AR gaming console 102. Based on the tracking data, synchronized AR gaming application 232 may alter the execution of one or more aspects of the computer-generated AR game. More specifically, synchronized AR gaming application 232 alters execution of the computer-generated AR game to alter the view of the user and display one or more AR objects to the user based on the tracking data. Further, synchronized AR gaming application 232 alters execution of the computer-generated AR game based on received sensor data in order to enable the synchronized AR gaming application 232 to continue executing as the first gaming console exits the first AR gaming environment and enters the second AR gaming environment.

At step 320, synchronized AR gaming application 232 synchronized AR gaming application 232 detects that AR gaming console 102 resides within a second AR gaming environment. More specifically, synchronized AR gaming application 232 detects one or more networks that are associated with a particular gaming environment. In some embodiments, synchronized AR gaming application 232 may detect a network signal from a network that AR gaming console 102 is authorized to access. Additionally or alternatively, synchronized AR gaming application 232 may detect that an RSSI level of a signal received from one or more external sensors or from a network interface associated with the second AR gaming environment is above a threshold level. The external sensors may be any one or more of the sensors described herein. Additionally or alternatively, synchronized AR gaming application 232 may detect that AR gaming console 102 has entered the second AR gaming environment based on geotagging and/or geo-fencing data. The gaming environment may be a local AR gaming environment 110, a vehicle AR gaming environment 120, or a play space AR gaming environment 130. At step 322, synchronized AR gaming application 232 connects to a network associated with the second AR gaming environment. The network may include, without limitation, point-to-point communications channels, Bluetooth, WiFi, infrared communications, wireless and wired LANs (Local Area Networks), one or more internet-based WANs (Wide Area Networks), and cellular data networks. At step 324, synchronized AR gaming application 232 detects one or more external sensors within the second AR gaming environment. The external sensors may be any one or more of the sensors described herein. At step 326, synchronized AR gaming application 232 tracks the user and/or other objects via the detected external sensors within the second AR gaming environment as well as the one or more sensors integrated into AR gaming console 102. Based on the tracking data, synchronized AR gaming application 232 may alter the execution of one or more aspects of the computer-generated AR game. More specifically, synchronized AR gaming application 232 alters execution of the computer-generated AR game to alter the view of the user and display one or more AR objects to the user based on the tracking data. Further, synchronized AR gaming application 232 alters execution of the computer-generated AR game based on received sensor data in order to enable the synchronized AR gaming application 232 to continue executing as the first gaming console exits the first AR gaming environment and enters the second AR gaming environment.

The method 300 then terminates. Additionally or alternatively, synchronized AR gaming application 232 may continue to external execute any or all of steps 304 through 326 as the user continues game play while entering and exiting various gaming environments.

In sum, techniques are disclosed for seamlessly transitioning across multiple gaming environments when executing an augmented reality computer-based AR game. A user may begin executing the computer-based AR game on an AR gaming console within a local gaming environment, such as the user's home. The user may leave the local gaming environment and enter a vehicle in order to travel to a play space. The AR gaming console automatically disconnects from the local gaming environment and connects to the vehicle gaming environment. When the user arrives at the play space, the user exits the vehicle and enters the play space. The AR gaming console automatically disconnects from the vehicle gaming environment and connects to the play space gaming environment. As a result, the AR gaming console fluidly and seamless transitions across the al gaming environment, vehicle gaming environment, and play space gaming environment.

In addition, users executing the computer-based AR game in one gaming environment may interact with other users in the same or different gaming environments. For example, a user executing the computer-based AR game within a vehicle gaming environment may encounter other users who are executing the computer-based AR game as pedestrians within a play space gaming environment. The AR gaming console of the user within the vehicle gaming environment communicates with the AR gaming consoles of the users within the play space gaming environment. As a result, the user within the vehicle gaming environment and the users within the play space gaming environment may interact with one another in the context of the computer-based AR game.

At least one technical advantage of the disclosed techniques relative to the prior art is that a user experiences a more seamless gaming experience when transitioning from one augmented reality gaming environment to another augmented reality gaming environment. In that regard, the disclosed techniques enable a user's AR headset to automatically disconnect from one augmented reality gaming environment and reconnect to the other augmented reality gaming environment without interrupting gameplay. In so doing, the user's AR headset automatically switches from receiving sensor data from sensors in the previous augmented reality gaming environment to receiving sensor data from sensors in the new augmented reality gaming environment. As a result, the user can have a more immersive and uninterrupted experience when playing a computer-based augmented reality game. These technical advantages represent one or more technological improvements over prior art approaches.

1. In some embodiments, a computer-implemented method for implementing augmented reality (AR) gameplay across multiple gaming environments comprises: detecting that a first gaming console that is executing an AR gaming application has exited a first AR gaming environment and entered a second AR gaming environment; connecting to a communications network associated with the second AR gaming environment; detecting, via the communications network, a sensor associated with the second AR gaming environment; and altering execution of the AR gaming application based at least in part on sensor data received via the sensor to enable the AR gaming application to continue executing as the first gaming console exits the first AR gaming environment and enters the second AR gaming environment.

2. The computer-implemented method according to clause 1, further comprising: detecting that the first gaming console has exited the second AR gaming environment and entered a third AR gaming environment; disconnecting from the communications network; and altering execution of the AR gaming application based at least in part on second sensor data received via a second sensor integrated into the first gaming console to enable the AR gaming application to continue executing as the first gaming console exits the second AR gaming environment and enters the third AR gaming environment.

3. The computer-implemented method according to clause 1 or clause 2, wherein detecting that the first gaming console has exited the first AR gaming environment comprises detecting that a received signal strength indicator (RSSI) level associated with second sensor data received via a second sensor associated with the first AR gaming environment is below a threshold level.

4. The computer-implemented method according to any of clauses 1-3, wherein the first AR gaming environment is associated with a vehicle, and wherein detecting that the first gaming console has exited the first AR gaming environment comprises detecting, via a second sensor associated with the first AR gaming environment, that a user associated with the first gaming console has exited a passenger compartment of the vehicle.

5. The computer-implemented method according to any of clauses 1-4, wherein the first AR gaming environment is associated with a residence, and wherein detecting that the first gaming console has exited the first AR gaming environment comprises detecting, via a second sensor associated with the first AR gaming environment, that a user associated with the first gaming console has exited a bounded area within the residence.

6. The computer-implemented method according to any of clauses 1-5, wherein detecting that the first gaming console has entered the second AR gaming environment comprises detecting a network signal associated with the communications network.

7. The computer-implemented method according to any of clauses 1-6, further comprising: detecting that a second gaming console that is executing the AR gaming application resides within a third AR gaming environment; determining that the second gaming console is within a threshold distance from the first gaming console; and altering execution of the AR gaming application to enable an interaction between the first gaming console and the second gaming console.

8. The computer-implemented method according to any of clauses 1-7, further comprising: detecting a computing device that is in communication with the communications network; determining that the computing device is configured to execute at least a portion of the AR gaming application; and offloading a task associated with the at least a portion of the AR gaming application to the computing device.

9. The computer-implemented method according to any of clauses 1-8, further comprising: detecting that the first gaming console is about to exit the second AR gaming environment; and offloading the task from the computing device to the first gaming console.

10. The computer-implemented method according to any of clauses 1-9, further comprising: detecting that a second gaming console that is executing the AR gaming application resides within the second AR gaming environment; and generating a mesh network that includes the first gaming console and the second gaming console.

11. In some embodiments, one or more non-transitory computer-readable media include instructions that, when executed by one or more processors, cause the one or more processors to perform the steps of: detecting that a first gaming console that is executing an AR gaming application has exited a first AR gaming environment and entered a second AR gaming environment; connecting to a communications network associated with the second AR gaming environment; detecting, via the communications network, a sensor associated with the second AR gaming environment; and altering execution of the AR gaming application based at least in part on sensor data received via the sensor to enable the AR gaming application to continue executing as the first gaming console exits the first AR gaming environment and enters the second AR gaming environment.

12. The one or more non-transitory computer-readable media according to clause 11, further comprising: detecting that the first gaming console has exited the second AR gaming environment and entered a second AR gaming environment; disconnecting from the communications network; and altering execution of the AR gaming application based at least in part on second sensor data received via a second sensor integrated into the first gaming console to enable the AR gaming application to continue executing as the first gaming console exits the second AR gaming environment and enters the third AR gaming environment.

13. The one or more non-transitory computer-readable media according to clause 11 or clause 12, wherein detecting that the first gaming console has exited the first AR gaming environment comprises detecting that a received signal strength indicator (RSSI) level associated with second sensor data received via a second sensor associated with the first AR gaming environment is below a threshold level.

14. The one or more non-transitory computer-readable media according to any of clauses 11-13, wherein the first AR gaming environment is associated with a vehicle, and wherein detecting that the first gaming console has exited the first AR gaming environment comprises detecting, via a second sensor associated with the first AR gaming environment, that a user associated with the first gaming console has exited a passenger compartment of the vehicle.

15. The one or more non-transitory computer-readable media according to any of clauses 11-14, wherein the first AR gaming environment is associated with an open play space, and wherein detecting that the first gaming console has exited the first AR gaming environment comprises detecting, via a second sensor associated with the first AR gaming environment, that a user associated with the first gaming console has exited a defined area within the open play space.

16. The one or more non-transitory computer-readable media according to any of clauses 11-15, wherein detecting that the first gaming console has entered the second AR gaming environment comprises detecting a network signal associated with the communications network.

17. The one or more non-transitory computer-readable media according to any of clauses 11-16, further comprising: detecting that a second gaming console that is executing the AR gaming application resides within a third AR gaming environment; determining that the second gaming console is within a threshold distance from the first gaming console; and altering execution of the AR gaming application to enable an interaction between the first gaming console and the second gaming console.

18. The one or more non-transitory computer-readable media according to any of clauses 11-17, wherein at least a portion of the AR gaming application is executing on a remote server in communication with the communications network, and further comprising receiving data associated with the AR gaming application via the remote server.

19. The one or more non-transitory computer-readable media according to any of clauses 11-18, further comprising disconnecting from a second communications network associated with the first AR gaming environment.

20. In some embodiments, a computing device comprises: a memory that includes instructions, and a processor that is coupled to the memory and, when executing the instructions, is configured to: detect that a first gaming console that is executing an AR gaming application has exited a first AR gaming environment and entered a second AR gaming environment; connect to a communications network associated with the second AR gaming environment; detect, via the communications network, a sensor associated with the second AR gaming environment; and alter execution of the AR gaming application based at least in part on sensor data received via the sensor to enable the AR gaming application to continue executing as the first gaming console exits the first AR gaming environment and enters the second AR gaming environment.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for implementing augmented reality (AR) gameplay across multiple gaming environments, the method comprising:

detecting that a first gaming console that is executing an AR gaming application has exited a first AR gaming environment and entered a second AR gaming environment;
connecting to a communications network associated with the second AR gaming environment;
detecting, via the communications network, a sensor associated with the second AR gaming environment; and
altering execution of the AR gaming application based at least in part on sensor data received via the sensor to enable the AR gaming application to continue executing as the first gaming console exits the first AR gaming environment and enters the second AR gaming environment.

2. The computer-implemented method of claim 1, further comprising:
detecting that the first gaming console has exited the second AR gaming environment and entered a third AR gaming environment;
disconnecting from the communications network; and
altering execution of the AR gaming application based at least in part on second sensor data received via a second sensor integrated into the first gaming console to enable the AR gaming application to continue executing as the first gaming console exits the second AR gaming environment and enters the third AR gaming environment.

3. The computer-implemented method of claim 1, wherein detecting that the first gaming console has exited the first AR gaming environment comprises detecting that a received signal strength indicator (RSSI) level associated with second sensor data received via a second sensor associated with the first AR gaming environment is below a threshold level.

4. The computer-implemented method of claim 1, wherein the first AR gaming environment is associated with a vehicle, and wherein detecting that the first gaming console has exited the first AR gaming environment comprises detecting, via a second sensor associated with the first AR gaming environment, that a user associated with the first gaming console has exited a passenger compartment of the vehicle.

5. The computer-implemented method of claim 1, wherein the first AR gaming environment is associated with a residence, and wherein detecting that the first gaming console has exited the first AR gaming environment comprises detecting, via a second sensor associated with the first AR gaming environment, that a user associated with the first gaming console has exited a bounded area within the residence.

6. The computer-implemented method of claim 1, wherein detecting that the first gaming console has entered the second AR gaming environment comprises detecting a network signal associated with the communications network.

7. The computer-implemented method of claim 1, further comprising:
detecting that a second gaming console that is executing the AR gaming application resides within a third AR gaming environment;
determining that the second gaming console is within a threshold distance from the first gaming console; and
altering execution of the AR gaming application to enable an interaction between the first gaming console and the second gaming console.

8. The computer-implemented method of claim 1, further comprising:
detecting a computing device that is in communication with the communications network;
determining that the computing device is configured to execute a portion of the AR gaming application; and
offloading a task associated with the portion of the AR gaming application to the computing device.

9. The computer-implemented method of claim 8, further comprising:
detecting that the first gaming console is about to exit the second AR gaming environment; and
offloading the task from the computing device to the first gaming console.

10. The computer-implemented method of claim 1, further comprising:
detecting that a second gaming console that is executing the AR gaming application resides within the second AR gaming environment; and
generating a mesh network that includes the first gaming console and the second gaming console.

11. One or more non-transitory computer-readable media including instructions that, when executed by one or more processors, cause the one or more processors to perform the steps of:
detecting that a first gaming console that is executing an AR gaming application has exited a first AR gaming environment and entered a second AR gaming environment;
connecting to a communications network associated with the second AR gaming environment;
detecting, via the communications network, a sensor associated with the second AR gaming environment; and
altering execution of the AR gaming application based at least in part on sensor data received via the sensor to enable the AR gaming application to continue executing as the first gaming console exits the first AR gaming environment and enters the second AR gaming environment.

12. The one or more non-transitory computer-readable media of claim 11, further comprising:
detecting that the first gaming console has exited the second AR gaming environment and entered a third AR gaming environment;
disconnecting from the communications network; and
altering execution of the AR gaming application based at least in part on second sensor data received via a second sensor integrated into the first gaming console to enable the AR gaming application to continue executing as the first gaming console exits the second AR gaming environment and enters the third AR gaming environment.

13. The one or more non-transitory computer-readable media of claim 11, wherein detecting that the first gaming console has exited the first AR gaming environment comprises detecting that a received signal strength indicator (RSSI) level associated with second sensor data received via a second sensor associated with the first AR gaming environment is below a threshold level.

14. The one or more non-transitory computer-readable media of claim 11, wherein the first AR gaming environment is associated with a vehicle, and wherein detecting that the first gaming console has exited the first AR gaming environment comprises detecting, via a second sensor associated with the first AR gaming environment, that a user associated with the first gaming console has exited a passenger compartment of the vehicle.

15. The one or more non-transitory computer-readable media of claim 11, wherein the first AR gaming environment is associated with an open play space, and wherein detecting that the first gaming console has exited the first AR gaming environment comprises detecting, via a second sensor associated with the first AR gaming environment, that a user associated with the first gaming console has exited a defined area within the open play space.

16. The one or more non-transitory computer-readable media of claim 11, wherein detecting that the first gaming console has entered the second AR gaming environment comprises detecting a network signal associated with the communications network.

17. The one or more non-transitory computer-readable media of claim 11, further comprising:
   detecting that a second gaming console that is executing the AR gaming application resides within a third AR gaming environment;
   determining that the second gaming console is within a threshold distance from the first gaming console; and
   altering execution of the AR gaming application to enable an interaction between the first gaming console and the second gaming console.

18. The one or more non-transitory computer-readable media of claim 11, wherein a portion of the AR gaming application is executing on a remote server in communication with the communications network, and further comprising receiving data associated with the AR gaming application via the remote server.

19. The one or more non-transitory computer-readable media of claim 11, further comprising disconnecting from a second communications network associated with the first AR gaming environment.

20. A computing device, comprising:
   a memory that includes instructions, and
   a processor that is coupled to the memory and, when executing the instructions, is configured to:
      detect that a first gaming console that is executing an AR gaming application has exited a first AR gaming environment and entered a second AR gaming environment;
      connect to a communications network associated with the second AR gaming environment;
      detect, via the communications network, a sensor associated with the second AR gaming environment; and
      alter execution of the AR gaming application based at least in part on sensor data received via the sensor to enable the AR gaming application to continue executing as the first gaming console exits the first AR gaming environment and enters the second AR gaming environment.

\* \* \* \* \*